Figure 1:
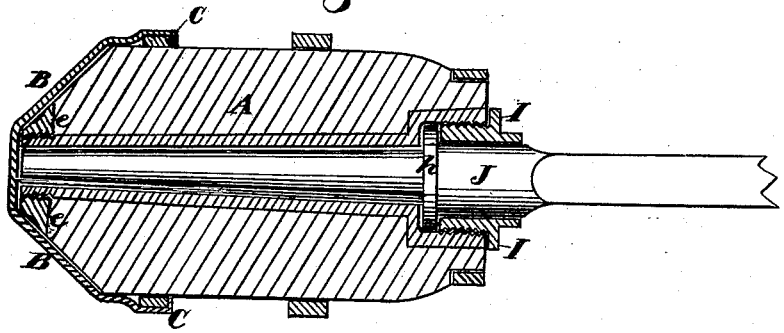

W. H. MASTERMAN.
WHEEL-HUB.

No. 169,715. Patented Nov. 9, 1875.

Witnesses
Geo. H. Strong.
C. M. Richardson

Inventor
Wm. H. Masterman
By his Atty's,
Dewey & Co

UNITED STATES PATENT OFFICE.

WILLIAM H. MASTERMAN, OF SAN LEANDRO, CALIFORNIA.

IMPROVEMENT IN WHEEL-HUBS.

Specification forming part of Letters Patent No. 169,715, dated November 9, 1875; application filed July 13, 1875.

*To all whom it may concern:*

Be it known that I, WILLIAM H. MASTERMAN, of San Leandro, Alameda county, State of California, have invented Improvements in Wheel-Hubs; and I do hereby declare the following description and accompanying drawings are sufficient to enable any person skilled in the art or science to which it most nearly appertains to make and use my said invention or improvements without further invention or experiment.

My invention relates to what I call an "anti-collision wheel-hub."

It is not an unusual spectacle, especially in the streets of cities where large numbers of vehicles are continually passing each other, for a portion of the street to become blocked by the interlocking of the projecting ends of the wheel-hubs of wagons. Most of the collisions which occur between wheeled vehicles are occasioned by the interlocking of the projecting ends of the hubs, and much damage is occasioned thereby. The object of my invention is to obviate this difficulty by constructing the projecting ends of the hubs so that in case two hubs should strike together, or the hub should strike any stationary object, it will be thrown off from and pass the other without locking, and without damage to the vehicle.

In order to describe my anti-collision wheel-hub, reference is had to the accompanying drawing, forming a part of this specification, in which—

Figure 1 is a longitudinal section of my invention.

Let A represent a wheel-hub. The outer end of this hub, commencing at or near the base of the spokes, I turn off to a circular or conical form, as represented. I prefer the conical form, as it leaves a larger bearing for the spindle, and at the same time gives the desired result in preventing the interlocking of two hubs by presenting an inclined or convex surface, which will easily free itself from any object which it may strike. Usually I shall cover this conical or circular outer end of the hub with a metallic cap, B, which conforms closely to the shape of the hub, and this cap will serve not only as an ornament to the hub, but will prevent damage to the wood of the hub in case it should strike any hard object. It will also strengthen the hub, and its superior solidity will cause the hub to move readily, and ward off objects against which it may strike. It will also serve to prevent dust and dirt from getting into the journal-box. In constructing this cap I form a ring or band, C, around its inner open end, which will surround the hub just outside of the spokes; and in applying the cap I shrink this ring upon the hub, so that it will perform the double duty of retaining the cap B in place and banding the hub outside of the spokes. The cap and band will, however, be made best in one piece. The nut $e$ secures the box in the hub by being screwed upon a thread cut upon the outside of the box, and it can be suitably constructed to admit the cap B over the end of the hub, and this nut, as well as the cap B, need not be disturbed until it is desired to renew the box. The wheel is retained in its place upon the spindle by a flange, $h$, and hollow nut I, in the ordinary manner, so that the wheel can be removed from the axle at any time without disturbing the cap.

In order to exclude dust, and make the box as tight as possible, I form a portion of the axle J, just behind the flange $h$, cylindrically, and the nut I, being bored out so as to exactly fit this cylindrical part of the axle, will form a most effectual dust-excluder.

It will be evident that the conical or inclined arrangement of the end of the hub could be used without any cap or covering, and still accomplish the same object, and various arrangements of the cap could be employed; but I prefer the plan above described.

I thus construct wheel-hubs so that they cannot collide with each other, or with any stationary object, and remain interlocked, or be damaged by collision, as the inclined construction of the outer end of the hub will force it away from the object against which it strikes, so that it can pass without locking.

Having thus described my invention, what I claim, and desire to secure by Letters Patent, is—

1. The improvement in wheel-hubs, consisting in forming the outer or projecting ends of the hub in a circular, conical, or tapering form, substantially as and for the purpose above described.

2. The cap B, constructed to fit the outer or projecting end of the hub A, and having the ring or band C on its inner rim, which also serves as a band for the hub, substantially as and for the purpose described.

WILLIAM H. MASTERMAN. [L. S.]

Witnesses:
 GEO. H. STRONG,
 C. M. RICHARDSON.